United States Patent [19]

Mueller et al.

[11] Patent Number: 4,866,155
[45] Date of Patent: Sep. 12, 1989

[54] POLESTER OF BIS(2-(HYDROXYPHENYL)-HEXA-FLUOROISOPROPYL)DIPHENYL ETHER

[75] Inventors: Werner H. Mueller, E. Greenwich; Dinesh N. Khanna, W. Warwick, both of R.I.

[73] Assignee: Hoechst Celanese Corporation, Somerville, N.J.

[21] Appl. No.: 124,743

[22] Filed: Nov. 24, 1987

[51] Int. Cl.$^4$ .............................................. C08G 63/18
[52] U.S. Cl. ...................................... 528/191; 428/480; 524/601; 524/603; 524/604; 524/605; 528/125; 528/167; 528/173; 528/174; 528/193; 528/226
[58] Field of Search ............... 528/191, 125, 167, 173, 528/174, 193, 226; 524/601, 603, 604, 605

[56] References Cited

U.S. PATENT DOCUMENTS

| 2,465,319 | 3/1949 | Whinfield | 260/75 |
| 3,028,364 | 4/1962 | Conix et al. | 260/47 |
| 3,028,366 | 4/1962 | Engle et al. | 260/75 |
| 3,398,120 | 8/1968 | Hindersinn et al. | 260/47 |
| 3,824,211 | 7/1974 | Howerton | 260/47 |
| 4,051,106 | 9/1977 | Gouinluck et al. | 260/47 |
| 4,255,555 | 3/1981 | Salee et al. | 528/179 |

OTHER PUBLICATIONS

Journal of Polymer Science: Part A: vol. 24, "Synthesis and Properties of Polyarylates from 2,2'Bis(4-hydroxyphenyl)-1,1,1,3,3,3-Hexafluoropropane and Aromatic Diacid Chlorides" (1986).

Primary Examiner—Harold D. Anderson
Attorney, Agent, or Firm—Perman & Green

[57] ABSTRACT

Polyesters of 4,4'bis[2-(4-hydroxyphenyl)hexafluoroisopropyl]diphenyl ether having high transparency, high solvent solubility and excellent melt processability are prepared. They possess high thermal and radiation stability and are useful in the preparation of protective films, protective paints, films, fibers, diffusion membranes and shaped articles where high service temperature and radiation resistance are desired.

21 Claims, No Drawings

POLESTER OF BIS(2-(HYDROXYPHENYL)-HEXAFLUOROISO-PROPYL)DIPHENYL ETHER

BACKGROUND OF THE INVENTION

This invention relates to the field of linear, thermoplastic polyesters. Linear, thermoplastic polyesters prepared from dicarboxylic acids and dihydric alcohols, and their derivatives, for example, those of an aromatic dicarboxylic acid such as isophthalic acid and an aromatic phenol and/or aliphatic dihydric alcohol are well known. Furthermore, their usefulness in the preparation of moldings, extrusions, castings, filaments, fibers and film forming applications is also known; see e.g., U.S. Pat. Nos. 3,028,364 and 3,398,120. Linear, high molecular weight polyesters can be prepared by melt, solution and interfacial polymerization techniques; see e.g., U.S. Pat. Nos. 2,465,319; 3,028,364; 3,028,366; 3,398,120; 4,051,106 and 4,255,555; the teachings of which are hereby incorporated by reference.

Polyesters of 4,4'-hexafluoroisopropylidene diphenols are described in the literature (see e.g., U.S. Pat. Nos. 3,388,097 and 3,824,211) as having a high degree of light stability, wash set recovery and resistance to soiling in fiber and fabric applications and in protective paint applications, high solubility in non-toxic solvents, heat, sunlight, weathering and jet lube and fuel resistance. All polyesters of these patents appear to be based on a polyester containing varying proportions of the isophthalate moiety. Maruyama et al, Journal of Polymer Science Part A, Polymer Chemistry Edition, Vol. 24, 3555–3558 (1986); at page 3556 report that the polyterephthalate of 2,2-bis(4-hydroxyphenyl)-hexafluoropropane is practically insoluble in chlorinated hydrocarbons (chloroform; 1,2-dichloroethane; sym tetrachloroethane) and dimethylformamide; m-cresol, pyridine and benzene.

It is the object of this invention, to provide new polyesters having the desired properties of the polymers of the above patents and improved properties.

SUMMARY OF THE INVENTION

This invention is that of novel polyesters obtained by the condensation of a dihydric alcohol component with a dicarboxylic acid component wherein said polyhydric alcohol component comprises 4,4'-bis[2-(4-hydroxyphenyl)hexafluoroisopropyl]-diphenyl ether or its chemically reactive equivalent. This novel polyhydric alcohol imparts improved properties such as improved solubility, soil resistance, thermal and radiation stability to polyesters prepared therefrom.

The polyesters of the invention have the following recurring group in the polymer chain which may be represented by the formula:

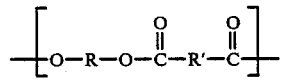

wherein:
R represents the divalent moiety:

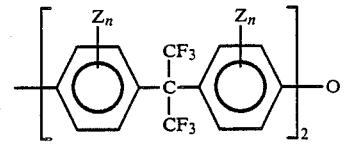

Z is a substituent independently selected from halogen and alkyl of 1 to 6 carbons; n is an integer independently selected from 0 to 4; and R' represents an alkylene, alicyclic or arylene divalent moiety and mixtures thereof.

The polyesters of the invention may be prepared by melt, solution or interfacial condensation methods. They may be prepared as high molecular weight products suitable for injection or compression moldings, extrusions, melt spun or solvent spun fibers and filaments and melt extruded or solution cast films. They also possess high solubility in a variety of non-toxic, low boiling solvents making them particularly useful in the preparation of protective coatings and paints of high thermal and radiation stability.

DETAILED DESCRIPTION OF THE PREFERRED EMBODIMENTS

This invention is that of novel polyesters obtained by the condensation a polyhydric alcohol component with a dicarboxylic acid component wherein said polyhydric alcohol component comprises 4,4'-bis[2-(4-hydroxyphenyl)hexafluoropropyl]diphenyl ether or its chemically reactive equivalent. The term "component" is used in this description to mean a compound or compounds and their chemically reactive equivalents or a mixture of said compounds or equivalents; e.g., the acid halides, esters and anhydrides of a dicarboxylic acid are reactive equivalents in forming polyesters depending up the polymerization technique employed in the condensation reaction.

The polyesters of the invention can be prepared by the same known techniques that are employed in the manufacture of other linear polyesters. They can be made by (1) transesterification in the molten state under reduced pressure preferably in the presence of a diluent, (2) homogeneous solution polymerization and (3) interfacial polymerization techniques; all of which are known to the skilled worker in the art. In this description, the interfacial batch polymerization technique is used which works well and does not require expensive equipment costs.

The novel polyesters have the following recurring unit in the polyester chain which may be represented by the formula:

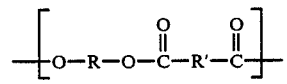

wherein:
R represents the divalent moiety:

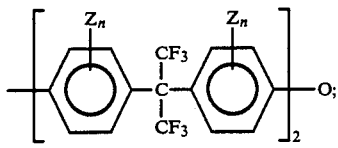

Z is a substituent which is independently selected from halogen, alkyl of 1 to 6 carbons; n is an integer independently 0 to 4; and R' represents an alkylene, alicyclic or arylene divalent moiety and mixtures thereof.

The substituent Z when its halogen, it is preferably selected from chloro or fluoro and when it is lower alkyl, it is preferably selected from methyl, ethyl, propyl or isopropyl which may be substituted with chloro or fluoro atoms.

The moiety R' represents a divalent alkylene of 1 to 20 carbons atoms, preferably, 2 to 10 carbons atoms; a saturated divalent alicyclic of 4 to 18 carbon atoms; preferably 6 to 10 carbon or a divalent arylene moiety of 1 to 4 six carbons rings characterized by benzenoid unsaturation. The R' moiety is preferably an arylene moiety.

The arylene moiety R' may be selected from:

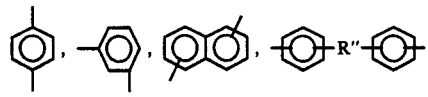

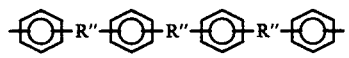

wherein R" is a divalent moiety independently selected from a covalent carbon to carbon bond, methylene, ethylene, propylene, isopropylene, dichloro and difluoroalkylenes up to 6 carbons, hexafluoroisopropylidene, 1-phenyl-2,2,2-trifluoroethylidene, oxy, thio, sulfinyl, sulfonyl, sulfonamido, carbonyl, oxydicarbonyl, oxydimethylene, sulfonyldioxy, carbonylidioxy, silanylene, disilanylene, polysilanylene up to 8 Si atoms; siloxanylene, disiloxanylene, and a polysiloxanylene up to 8 Si atoms. Preferably, the linking group R" is selected from oxy, hexafluoroisopropylidene, carbonyl, methylene, a covalent carbon to carbon bond, disiloxanylene and polysiloxanylenes, most preferably, hexafluoroisopropylidene, 1-phenyl-2,2,2-trifluoroethylidene, and oxy.

The hydrogen atoms of the linking groups R' and R" may be substituted by non-interferring monovalent substitutents such as chloro, fluoro, lower alkyl up to 6 carbons and phenyl. Also, as used herein, the terms "aromatic" and "alicyclic" are meant to include heteroaromatics and heteroalicylics wherein one or more of ring carbon atoms have been replaced with —O—, —S—, or —N— atoms.

The interfacial polymerization technique for preparing polyesters involves the condensation of a dihydric alcohol with a dihalide derivative of a dicarboxylic acid. This condensation technique is disclosed in the literature; see e.g., U.S. Pat. No. 3,824,211—the teachings of which are incorporated by reference. The reactants are preferably used in equal molar quantities. However, monofunctional chain terminator may be employed to improve the thermal stability such as diphenyl carbamoyl chloride, benzoyl chloride, naphthaloyl chloride, tertiary butyl phenol etc., which is taught in the above referenced patent.

The polyesters of the invention may be prepared using 5 to 100 mole percent of the bis-[(2-hydroxyphenyl)hexafluoroisopropyl]diphenyl ether; more preferably, 30 to about 70 mole percent and most preferably about 70 mole percent to 100 mole percent based upon the total moles of dihydric alcohol component. Other dihydric alcohols may be used as comonomers, preferably they are aryl if higher thermal stability is desired.

The dicarboxylic acid component may be aliphatic, cycloaliphatic, aromatic or mixtures thereof. If higher thermal stability is desired, the aromatic dicarboxylic acid components are preferred.

Typical examples of other dihydric alcohols which may be employed in the invention are:
bis(4-hydroxyphenyl)methane;
bis(2-hydroxyphenyl)methane;
bis(3-methyl-4-hydroxyphenyl)methane;
bis(4-hydroxy-3,5-dichlorophenyl)methane;
bis-(4-hydroxy-3,5-dibromophenyl)methane;
bis(4-hydroxy-3,5-difluorophenyl)methane;
bis-phenol-A[bis(4-hydroxyphenyl)-2,2-propane];
bis(3-chloro-4-hydroxyphenyl)-2,2-propane;
bis(4-hydroxy-3,5-dichlorophenyl)-2,2-propane;
bis(4-hydroxynaphthyl)-2,2-propane;
bis(4-hydroxyphenyl)phenyl methane;
bis(4-hydroxyphenyl)diphenyl methane;
bis(4-hydroxyphenyl)-4'-methyl phenyl methane;
bis(4-hydroxyphenyl)-4'-chlorophenyl methane;
bis(4-hydroxyphenyl)-2,2,2-trichloro-1,1,2-ethane;
bis(4-hydroxyphenyl)-1,1-cyclohexane;
bis(4-hydroxyphenyl)-cyclohexyl methane;
4,4-dihydroxyphenyl;
2,2'-dihydroxydiphenyl;
dihydroxyhaphthylenes;
bis(4-hydroxyphenyl)-2,2-butane;
bis(2,6-chloro-4-hydroxyphenyl)-2,2-propane;
bis(2-methyl-4-hydroxyphenyl)-2,2-propane;
bis(3-methyl-4-hydroxyphenyl)-1,1-cyclohexane;
bis(2-hydroxy-4-methylphenyl)-1,1-butane;
bis(2-hydroxy-4-terbutylphenyl)-2,2-propane;
bis(4-hydroxyphenyl)-1-phenyl-1,1-ethane;
4,4'-dihydroxy-3-methyl diphenyl-2,2-propane;
4,4'-dihydroxy-3-methyl-3'-isopropyl-diphenyl-2,2-butane;
bis(4-hydroxyphenyl)sulfide;
bis(4-hydroxyphenyl)ketone;
bis(4-hydroxyphenyl)oxide;
bis(4-hydroxyphenyl)sulfone;
bis(4-hydroxyphenyl)sulfoxide;
bis(4-hydroxyphenyl)sulfonate;
bis(4-hydroxyphenyl)amine;
bis(4-hydroxyphenyl)phenyl phosphine oxide;
2,2-bis(3-chloro-4-hydroxyphenyl)propane;
4,4'-(cyclohexymethylene);
bis(2,6-chlorophenol);
2,2-bis(3,5-dichloro-4-hydroxyphenyl)-propane;
2,2-bis-3,5-dibromo-4-hydroxyphenyl)-propane;
1,1-bis-(3,5-dichloro-4-hydroxyphenyl)-1-phenyle-thane;
2,2-bis-(3,5-dibromo-4-hydroxyphenyl)hexane;
4,4'-dihydroxy-3,3';

5,5'-tetra-chlorodiphenyl;
2,2-bis(3-chloro-4-hydroxyphenyl)-propane;
2,2-bis-(3,5-dibromo-4-hydroxyphenyl)-propane;
2,2-bis(3,5-dichloro-4-hydroxyphenyl)-propane;
tetrachlorodiphenylolsulfone;
bis(3,5-dibromo-4-hydroxyphenyl)-phenyl phosphine oxide;
bis(3,5-dibromo-4-hydroxyphenyl)-phenyl phosphine oxide;
bis(3,5-dibromo-4-hydroxyphenyl)-sulfoxide;
bis(3,5-dibromo-4-hydroxyphenyl)-sulfone;
bis(3,5-dibromo-4-hydroxyphenyl)-sulfonate;
bis(3,5-dibromo-4-hydroxyphenyl)-sulfide;
bis(3,5-dibromo-4-hydroxyphenyl)-amine;
bis(3,5-dibromo-4-hydroxyphenyl)-ketone; and
2,3,5,6,2',3',5'6',-octochloro-4,4'-hydroxy biphenyl;
o,o-biphenol;
m,m'-biphenol;
p,p'-biphenol;
bicresols; such as 4,4'-bi-o-cresol;
6,6-bi-o-cresol;
4,4'-bi-m-cresol;
dibenzyl biphenols such as a,a'-diphenol-4-4'-bi-o-cresol;
diethyl bisphenols; such as 2,2'-diethyl-p,p;-biphenol; and 5,5'-diethyl-o,o-biphenol;
dipropyl biphenols such as 5,5'-dipropyl-o,o'-biphenol; and 2,2'-diisopropyl-p,p'-biphenol;
diallyl biphenols such as 2,2'-diallyl-p,p'-biphenol; and
dihalobiphenols; such as
4,4'-dibromo-o,o'-biphenol;
4,4'-(hexafluorocyclobutylidene)diphenol;
4,4'-(sym-dichloro-tetrafluoroisopropylidene)diphenol;
4,4'-(chloropentafluoroisopropylidene)diphenol;
4,4'-hexafluoroisopropylidene diphenol;
ethylene glycol;
diethylene glycol;
triethylene glycol;
tetraethylene glycol;
propylene glycol;
dipropylene glycol;
polypropyleneglycol;
hexylene glycol;
2-methyl-2-ethylhexylene glycol;
1,3-propanediol;
2-ethyl-1,3-hexanediol;
1,5-pentanediol;
polyethylene glycols;
2,2,4-trimethyl-1,3-pentanediol and mixtures and isomers thereof. Illustrative halodicarboxylic acids which may be employed include the acid halides of:
isophthalic acid;
terephthalic acid;
4,4'-hexafluoroisopropylidene dibenzoic acid;
phthalic acid;
1,4-phenylenediethanoic acid;
4,4'-biphenyl dicarboxylic acid;
1,1-bis(4-carboxyphenyl)-1-phenyl-2,2,2-trifluoroethane;
4,4'-dicarboxy diphenyl ether;
bis-(4-carboxyphenyl)-methyl phosphane oxide;
4,4'-dicarboxyltetraphenylsilane;
bis(4-carboxyphenol)-sulfone;
5-tertiary butyl isophthalic acid;
5-bromoisophthalic acid;
5-fluoro-isophthalic acid;
5-chloro-isoophthalic acid;
2,2-bis-(p-carboxyphenyl)propane;
4,4-(p-phenylenedioxy) dibenzoic acid;
2,6-naphthalene dicarboxylic acid;
1,4-cyclohexane dicarboxylic acid;
1,3-cyclopentane dicarboxylic acid;
oxalic acid;
1,2-cyclobutadane dicarboxylic acid;
1,4-cyclohexane diacetic acid;
malonic acid;
1,10-decane dicarboxylic acid;
succinic acid;
1,12-dodecane dicarboxylic acid;
1,18-octadecane dicarboxylic acid;
2,6-cyclohexane dicarboxylic acid;
adipic acid;
2,6-cyclohexane dihexanoic acid;
bis[2-(carboxylphenyl)hexafluoroisopropyl]diphenyl ether and mixtures thereof.

The preferred dihydric alcohol comonomers are bisphenol A and 4,4'-hexafluoroisopropylidene diphenol. The preferred dicarboxylic acid components being selected from isophthaloyl chloride, terephthaloyl chloride, mixtures of isophthaloyl and terephthaloyl chloride, 2,2-hexafluoro-bis(4-chlorocarbonylphenyl)propane, 1,1-bis(4-carboxyphenyl)-1-phenyl-2,2,2-trisfluoroethylidene and 4,4'-bis[2-(4-chlorocarbonylphenyl)-isopropyl]diphenyl ether.

The novel dihydric alcohols used in the preparation of the polyesters of the invention are prepared following the illustrative procedure of Example 1 below:

EXAMPLE 1

Preparation of 4,4'-Bis[2-(4-hydroxyphenyl)hexafluoroisopropyl]diphenylether

To a stainless steel pressure vessel are charged 4,4'-bis(2-hydroxyphenyl)hexafluoroisopropyl)diphenylether - prepared according to U.S. Pat. No. 3,355,500 - phenol and hydrogen fluoride in a molar ratio of at least 1:2:10 and heated to temperature between 100° and 170° C. from 24 to 96 hours while stirring. After removing hydrogen fluoride by evaporation the solid residue is dissolved in ethanol and purified by refluxing in presence of charcoal. From the filtered solution a white crystalline precipitate of 4,4-bis[2-(4-hydroxyphenyl)-hexfluoroisopropyl]diphenyl ether is obtained melting at 179°-180° C. This invention is illustrated by referring to the examples which follow. These examples which ilustrate specific embodiments of the invention should not be construed to limit the invention in any way.

EXAMPLE 2

A cold solution consisting of 8.175 gm (0.0125 mole) of 4,4'-bis[2-(4-hydroxyphenyl)hexafluoroisopropyl]-diphenyl ether and 110 ml of water, 1.0 gm (0.025 mol) sodium hydroxide and 10 ml (10% solution) sodium lauryl sulfate solution is placed in a Waring blender. While rapidly stirring the solution a second cold solution comprising 1.27 gm (0.00625 mole) isophthaloyl chloride, 1.27 gm terephthaloyl chloride in 60.0 ml dichloroethane is added and the two phase system is rapidly stirred for a period of 5 minutes. The resulting solution is poured into water. The polymer portion is slightly viscous and is re-dissolved in toluene and precipitated in cold water methanol mixture to isolate the polymer.

The yield of polymer is nearly quantitative and its inherent viscosity was 0.42 dl/g in dimethylacetamide at 0.5% concentration at 25° C.

EXAMPLE 3.

The procedure of Example 2 was repeated using 5.3625 grams of 2,2-hexafluoro-bis(4-chlorocarbonyl)-phenyl propane in place of the terephthaloyl isophthaloyl chloride dicarboxylic acid component. The resulting polyester had an inherent viscosity of 0.55 dl/g in dimethylacetamide at 0.5% concentration at 25° C.

EXAMPLE 4

Example 2 was repeated except 3.6875 grams of the acid chloride of 4,4'-dicarboxydiphenyl ether was used in place of the tere/isophthaloyl chloride mixture. The resulting polymer had an inherent viscosity of 0.51 dl/g of dimethylacetamide at 0.5% concentration and 25° C. The glass transition temperature was 186° C. by DSC (differential scanning calorimetry).

EXAMPLE 5

The procedure of Example 2 was used except 9.3375 grams of 4,4'-bis[2-(4-chlorocarbonylphenyl)hexafluoroisopropyl]diphenyl ether was used. This dicarboxylic acid chloride is prepared in accordance with the following procedure.

Preparation of Acid Chloride of 4,4'-bis[2-4-chlorocarbonylpheny)hexafluoroisopropyl]diphenylether (a) To a clean, dry stainless steel autoclave are charged 4,4'-bis(2-hydroxy-hexafluoroisopropyl)diphenylether-synthesized according to U.S. Pat. No. 3,355,500 - toluene and hydrogen fluoride in a molar ratio of at least 1:2:10 followed by sealing and heating at temperatures between 100° and 170° C. for 24 to 96 hours. At 80° C. the autoclave is vented and hydrogen fluoride is evaporated. After cooling to room temperature methylene chloride is added and the reaction mixture is discharged into water. The organic layer is separated, washed twice with water and dried over calcium chloride. The solvent is stripped off and the residue is recrystallized from ethanol yielding 4,4'-bis-[2-(4-methylphenyl)hexafluoroisopropyl]diphenylether. M.P. 80°-90° C.

(b) 4,4'-bis[2-(4-methylphenyl)hexafluoroisopropyl]-diphenylether is dissolved in acetic acid and a catalyst prepared from Co(OAc)$_2$. 4 H$_2$O, Mn(OAc)$_2$. 4 H$_2$O and HBr in acetic acid is added. The reaction is performed in a glass pressure vessel by heating the mixture up to 180° C. and an oxygen pressure of 6.5 bar. After the oxygen uptake has finished the contents of the reaction vessel are discharged into a distillation apparatus and acetic acid is distilled off. The residue is cooled to room temperature and the crystalline product is collected on a funnel. After washing several times with acetic acid and water the 4,4'-bis[2-(4-carboxyphenyl)-hexafluoroisopropyl]diphenylether is dried in vacuo. M.P. 238°-240° C.

(c) To a slurry of 4,4'-bis[2-(4-carboxyphenyl)hexafluoroisopropyl]diphenylether in thionylchloride are added a few drops of dimethylformamide. The mixture is heated at reflux till the evolution of hydrogen chloride stops. The excess of thionylchloride is stripped off. Toluene is added to remove the residual thionylchloride by distillation. The solvent is stripped off and the crude product is recrystallized from n-hexane. M.P. 144°-145° C. The resulting polymer had an inherent viscosity of 0.12 dl/g at 0.5% concentration at 25° C.

EXAMPLE 6

The procedure of Example 2 is followed using 2.5375 grams of isophthaloyl chloride instead of the iso/tere mixture. A soluble polymer will be obtained.

EXAMPLE 7

The procedure of Example 2 was followed except 2.5375 grams of terephthaloyl chloride was used instead of the iso/tere phthaloyl mixture. The polmer had an inherent viscosity of 0.81 dl/g in dimethylacetamide and was soluble in toluene. The polymer's glass transition temperature was 202° C. as determined by differential scanning calorimetry.

A film was cast of this terephthalate polymer from a ten percent solution in dimethylacetamide. The polymer exhibited excellent film forming properties and the resulting film was tough and clear (absolutely transparent).

The polymer was also tested for solubility in various other solvents and the results of this text follow:

| Solvent | Solubility |
| --- | --- |
| chloroform | partial soluble |
| sym-tetrachloroethane | soluble |
| 1,2-dichloroethane | " |
| dimethylformamide | " |
| m-cresol | " |
| pyridine | " |
| benzene | " |
| dimethylacetamide | " |
| N—methyl pyrrolidone | " |

EXAMPLE 8

The procedure of Example 2 is repeated using oxydiphthaloyl chloride (4,4'-para-diphenyl ether dibenzoyl chloride) as the dicarboxylic acid component. A solvent soluble polyester will be produced.

The following Table 1 illustrates a comparison with the polyesters of U.S. Pat. No. 3,824,211 and the present invention. It illustrates the improved solubility of the polyesters of the invention, their lower processing temperatures and essentially equivalent thermal stability. The polymers tested were from 50/50 molar mixture of isophthaloyl and terephthaloyl chloride with the dihydric alcohols of the reference and the other invention.

TABLE 1

| Composition | U.S. Pat. No. 3,824,211 | Invention (Ex. 2) |
| --- | --- | --- |
| Tg | 221° C. | 195° C. |
| TGA* | 480° C. | 475° C. |
| Viscosity (inh) | 0.40 dl/g | 0.42 dl/g |
| Film/solvent cast | Transparent flexible to brittle | Transparent Flexible |
| Molding | — | compression molded |
| Solubility | | |
| Toluene | Soluble (~10%) | Sol (20~30%) |
| MEK | Soluble (~10%) | Sol (20~30%) |

*The TGA is defined herein as the temperature at which the polymer loses five weight percent when heated in air at rate of 20° C. per minute.

The polyesters of the invention are useful as radiation protective films or coatings. They also possess excellent diffusion characteristics which renders them useful as selective diffussion membranes with high thermal and radiation stability. They possess the ability to diffuse oxygen and water at high rates; see Table 2.

TABLE 2

| Product | Polyester of Example 2 |
|---|---|
| $O_2$ (cc/m²/mil/day) | 8000 at 25° C. |
| | 8840 at 25° C. |
| | 12600 at 45° C. |
| $H_2O$ (cc/m²/mil/day) | 100 at 25° C. |
| | 108 at 25° C. |

EXAMPLE 9

The polyester of Example 2 was dissolved in toluene at a solids concentration of 10 percent by weight. A film was cast of the solution on a plate and dried. A ½"×2" test piece was cut from the film and tested on an Instron Tensile Strength: 7300 psi
Tensile Modulus: 238×10³ psi
% Elongation (strain): 3.6%

The film was tough, transparent and flexible. The polyester of Example 2 was also compression molded at 280°–300° C. under pressure.

The polyesters of the invention may be prepared as high molecular weight products suitable for injection or compression moldings, extrusions, melt spun or solvent spun fibers and filaments and melt extruded or solution cast films. Advantageously fillers such as glass fibers, silica, molybdenum, graphite, and PTFE may be compounded or blended with the above specified polyesters to form molding and extrusion composition.

In the preparation of laminates, a laminating varnish may be prepared by dissolving the above specified polyamides in a suitable solvent such as N-methylpyrrolidone, diglyme, dimethylformamide, propyl glycol methyl ether, etc. The polyester varnish solution is then applied to a suitable reinforcing fabric such as a boron fiber fabric, a quartz fiber fabric, graphite or glass fabric and the solvent removed and a fused shaped part is formed using vacuum bag or autoclave laminating procedures. Similarly, these polyesters may be processed into fibers by melt or solution techniques and knitted or braided into a fabric or structural form which is then laminated with a reinforcing fabric of glass, boron, quartz or graphite, optionally with a laminating varnish, under heat and pressure. Similarly, glass, quartz, boron and graphite fibers may be mixed with a solution of these polyesters, the solvent removed by heat and optionally reduced pressure and the mixture fused into an article of the desired shape by the use of heat and pressure.

They also possess high solubility in a variety of non-toxic, relatively low boiling solvents making them particularly useful in the preparation of laminating varnishes, protective coatings and paints of high thermal and radiation stability. In addition, their high transparency and high Tg makes them particularly suited for optical fiber applications.

The invention has been described in the above specification by reference to specific embodiments in the illustrative examples. However, it is to be understood that these embodiments are not intended to limit the invention since changes and modifications in specific details disclosed therein can be made without departing from the scope of the invention.

We claim:

1. A linear thermoplastic polyester comprising a recurring unit in the polymer chain which is represented by the structure:

$$-\left[O-R-O-\overset{O}{\underset{\|}{C}}-R'-\overset{O}{\underset{\|}{C}}\right]-$$

wherein:
R is a divalent moiety of the formula:

$$-\left[\left(\underset{Z_n}{\bigcirc}\right)-\underset{CF_3}{\overset{CF_3}{\underset{|}{C}}}-\left(\underset{Z_n}{\bigcirc}\right)\right]_2-O$$

Z is a substituent selected from halogen or lower alkyl of 1 to 6 carbons or phenyl; n is an integer independently selected from 0 to 4 and
R' represents an alkylene, alicylic or arylene divalent moiety or mixtures thereof.

2. A polyester according to claim 1 wherein the divalent moiety R is:

$$-\left[\left(\bigcirc\right)-\underset{CF_3}{\overset{CF_3}{\underset{|}{C}}}-\left(\bigcirc\right)\right]_2-O$$

3. A polyester according to claim 1 wherein R' is selected from the residuum of:
isophthaloyl chloride;
terephthaloyl chloride;
2,2-bis(4-chlorocarbonylphenyl)hexafluoropropane;
1,1-bis(4-carboxyphenyl)-1-phenyl-2,2,2-trifluoroethane;
4,4'-bis[2-(4-chlorocarbonylphenyl)hexafluoroisopropyl]diphenyl ether;
or mixtures thereof.

4. A filament comprising a polyester according to claim 1, 2 or 3.

5. A self-supporting film comprising a polyester according to claim 1, 2 or 3.

6. A fiber comprising a polyester according to claim 1, 2 or 3.

7. A fabric comprising a polyester fiber according to claim 6.

8. A molded article comprising a polyester according to claim 1, 2 or 3.

9. An extruded profile comprising a polyester according to claim 1, 2, or 3.

10. A protective film coating comprising a polyester according to claim 1, 2 or 3.

11. A pigmented paint composition comprising a polyester according to claim 1, 2 or 3.

12. An optical fiber comprising a polyester according to claim 1, 2 or 3.

13. A polyester according to claim 2 wherein R is the polyester condensation residuum of 4,4'-bis[2-(4-hydroxyphenyl)hexafluoroisopropyl]diphenylether.

14. A polyester according to claim 13 wherein $R^1$ is the polyester condensation residuum of a mixture of isophthaloyl chloride and terephthaloyl chloride

15. A polyester according to claim 13 wherein $R^1$ is the polyester condensation residuum of isophthaloyl chloride.

16. A polyester according to claim 13 wherein $R^1$ is the polyester condensation residuum of terephthaloyl chloride.

17. A polyester according to claim 13 wherein $R^1$ is the polester condensation residuum of 2,2-hexafluoro-bis(4-chlorocarbonyl)phenyl propane.

18. A polyester according to claim 15 wherein $R^1$ is the polyester condensation residuum of 4,4'bis[2-(4-chlorocarbonylphenyl)hexafluoroisopropyl]-diphenyl ether.

19. A solution comprising the polyester of claim 2 dissolved in organic solvent.

20. A laminate comprising a polyester according to claim 1, 2 or 3.

21. A membrane comprising a polyester according to claim 1, 2 or 3.

* * * * *

UNITED STATES PATENT OFFICE
CERTIFICATE OF CORRECTION

Patent No. 4,866,155  Dated September 12, 1989

Inventor(s) W. H. Mueller et al

It is certified that error appears in the above-identified patent and that said Letters Patent is hereby corrected as shown below:

In the heading, line [54], change the title from "Polester of Bis(2-Hydroxyphenyl)-Hexafluoroisopropyl)Diphenyl Ether" to --"Polyester of Bis(2-Hydroxyphenyl)-Hexafluoroisopropyl)Diphenyl Ether"--.

Signed and Sealed this

Nineteenth Day of March, 1991

Attest:

HARRY F. MANBECK, JR.

Attesting Officer  Commissioner of Patents and Trademarks